United States Patent [19]

Farrell

[11] 4,043,735
[45] Aug. 23, 1977

[54] BALLOON BLOW MOLDING TOOLING

[75] Inventor: John J. Farrell, Green Brook, N.J.

[73] Assignee: Farrell Patent Company, Green Brook, N.J.

[21] Appl. No.: 671,054

[22] Filed: Mar. 29, 1976

Related U.S. Application Data

[62] Division of Ser. No. 419,510, Nov. 28, 1973, Pat. No. 3,955,908.

[51] Int. Cl.² .............................................. B29C 17/07
[52] U.S. Cl. .................................... 425/389; 425/526; 425/535
[58] Field of Search ................. 138/42, 114, 111, 113; 425/468, DIG. 203, DIG. 204, 387 B, 384, DIG. 208

[56] References Cited

U.S. PATENT DOCUMENTS

| | | | |
|---|---|---|---|
| 2,259,433 | 10/1941 | Kitto | 138/113 X |
| 2,363,107 | 11/1944 | Young | 425/389 |
| 3,719,251 | 6/1973 | Hedrick | 138/114 X |
| 3,816,046 | 6/1974 | Farrell | 425/389 X |
| 3,910,746 | 10/1975 | Mrusek et al. | 425/DIG. 208 |

Primary Examiner—Richard B. Lazarus
Attorney, Agent, or Firm—Marvin Feldman; Stephen E. Feldman

[57] ABSTRACT

This invention relates to blow molding apparatus for making plastic articles. It circulates cooling fluid through core rods for cooling blown articles from the inside, preferably with the blown article on the outside of a balloon that is permanently connected with the core rod. The connection of the balloon to the core rod is constructed so that there is no axial pull on the balloon during stripping of the blown article from the core rod and balloon. The invention provides constructions for admitting air between the balloon and a blown parison to break the vacuum when the balloon is to be collapsed. Fluid is also circulated over the outside of the blown parison to cool it, and this can be done in a perforated shroud that serves as a blowing mold, particularly for flexible wall containers.

2 Claims, 11 Drawing Figures

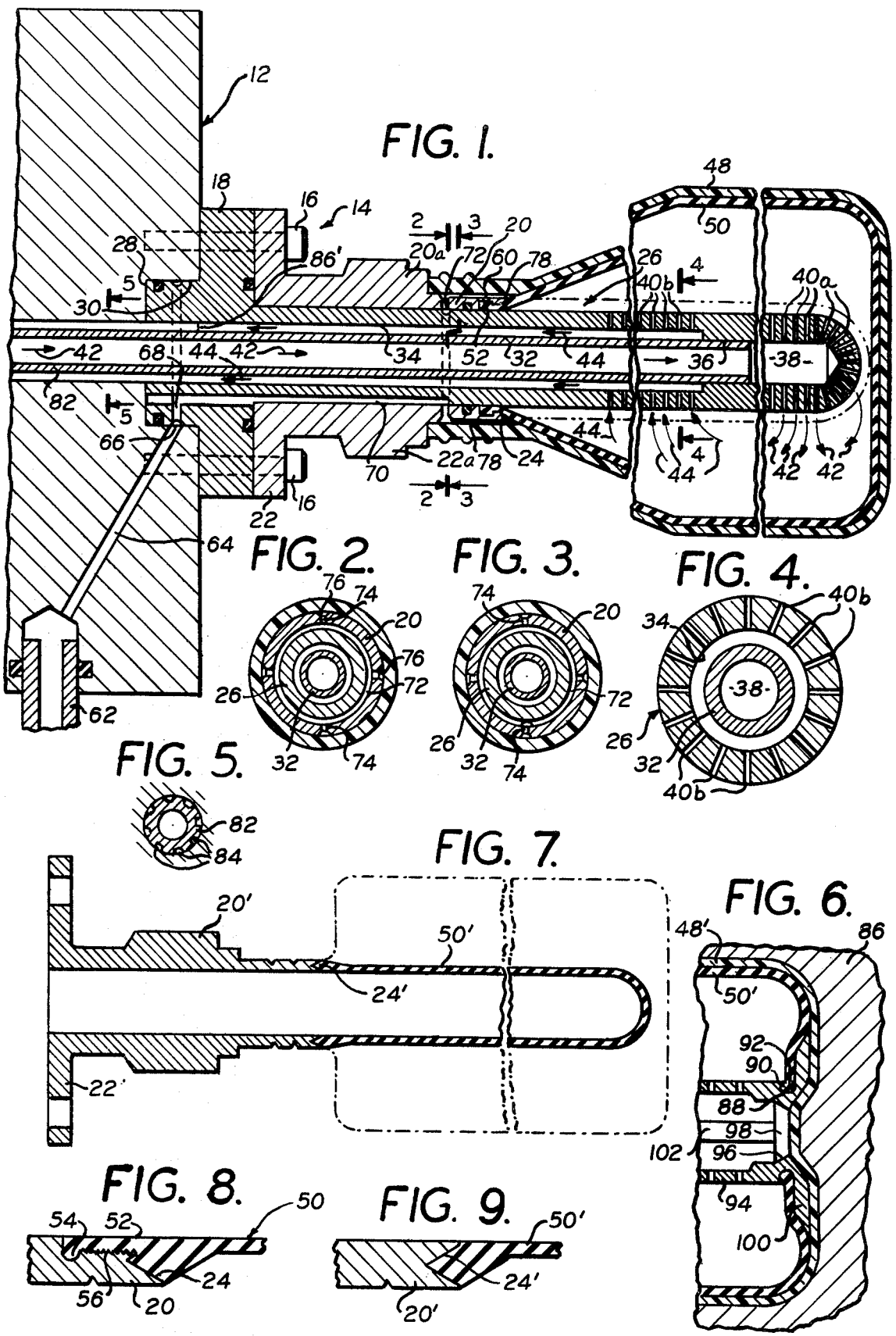

BALLOON BLOW MOLDING TOOLING

This is a division of application Ser. No. 419,510, filed Nov. 28, 1973, now U.S. Pat. No. 3,955,908.

BACKGROUND AND SUMMARY OF THE INVENTION

Conventional injection blow molding apparatus operates through a cycle beginning with the injection of plastic material into an injection mold containing a core rod. A parison is formed around the core rod, and the injection mold then opens and permits the core rod to move to the next performance station.

The second station is usually a blowing mold in which the parison is blown to the desired shape of a finished article; and when the blown article cools sufficiently, it is removed from the blowing mold and transferred to a stripper station. At the stripper station the blown article is removed from the core rod.

One of the limitations on the speed of a conventional cycle is the time required to cool the blown article sufficiently to remove if from the blowing mold and to the stripper station. One of the principal purposes of this invention is to cool the blown article more quickly and thereby reduce time cycle of the machine and correspondingly increase the production of the blow molding machine.

This invention includes, in its preferred embodiment, an elastic balloon which is attached to a core rod assembly in position to hug the core rod when the balloon is deflated. When a parison is formed over the core rod, it is applied over the outside of the collapsed balloon and over a short length of the core rod assembly beyond the end of the balloon. This short length of the parison is the portion which forms the mouth or neck of the article to be blown and it is a portion of the parison which is not expanded in the blow mold.

The balloon has two important advantages. One is that it permits the blown article to be cooled from the inside. Cooling fluid can be circulated through the inside of the balloon during a blowing operation and immediately after the completion of the blowing operation. The core rod of this invention is constructed so that cooling fluid flows from inside the core rod into the space between the core rod and the expanding balloon and parison; and this cooling fluid exhausts through other passages communicating with exhaust openings in the side of the core rod. If desired, fluid of any temperature can be circulated for the purpose of obtaining an orientation temperature of the parison before its final expansion to the shape of the desired article.

Part of the construction of this invention relates to the way in which the balloon is attached to the core rod assembly in such a way that the balloon connection to the core rod assembly is not subjected to any axial pull when the blown article is being stripped from the core rod. In the preferred construction, a sleeve which has a shoulder on one end, serves as part of the parison supporting surface of the core rod assembly. The balloon is attached to the core rod assembly in an undercut cavity at the shoulder of the sleeve and the diameter of the collapsed balloon is less than that of the sleeve so that the balloon is protected from axial pull when an article blown on the core rod assembly is stripped from the core rod assembly by a stripper plate bearing against the part of the blown article that is formed on the surface of the sleeve.

The invention also includes several provisions for admitting air between the blow parison and the outside surface of the balloon so that the balloon can collapse after the parison is fully blown to the shape of the desired article. Without provision for admitting air between the outside surface of the balloon and the blown parison, the balloon would be prevented from collapsing, independently of the blown parison, because of the existence of vacuum between the parison and the balloon.

One modification of the invention has provision for circulating fluid within the parison to control the temperature and more specifically to reduce the temperature quickly. This modification also has provision for cooling the parison from the outside by circulating cooling fluid into contact with the outside of the parison in the blowing mold. A special type of blowing mold can be used in which the article is blown within a shroud having a multitude of openings into which fluid enters to form a fluid cushion, preferably an air cushion, inside the shroud. The article is blow into contact with this cushion which increases in pressure as the parison expands toward the inside surface of the shroud. This blowing of the parison against an air cushion instead of into contact with a solid surface is intended especially for use with containers having rigid mouth or neck portions and flexible and pliant body portions.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views:

FIG. 1 is a diagrammatic sectional view showing a core rod support and core rod assembly with a balloon and blown parison on the core rod assembly and with provision for admitting air between the balloon and the blown parison to permit collapse of the balloon while the blown parison retains its blown shape;

FIGS. 2 and 3 are sectional views taken on the lines 2—2 and 3—3, respectively, of FIG. 1;

FIG. 4 is an enlarged sectional view taken on the line 4—4 of FIG. 1;

FIG. 5 is a fragmentary sectional view taken on the line 5—5 of FIG. 1;

FIG. 6 is a fragmentary sectional view showing a modified end construction for the core rod of FIG. 1 and a connection of an open-ended balloon with the core rod, the structure being shown within a blowing mold;

FIG. 7 is a diagrammatic view of a modified form of the sleeve shown in FIG. 1 with the balloon attached in a different way;

FIG. 8 is a greatly enlarged fragmentary sectional view showing the connection of the balloon to the sleeve in FIG. 1;

FIG. 9 is a greatly enlarged sectional view showing the connection of the balloon to the sleeve of FIG. 7;

DESCRIPTION OF PREFERRED EMBODIMENTS

Figure 10:
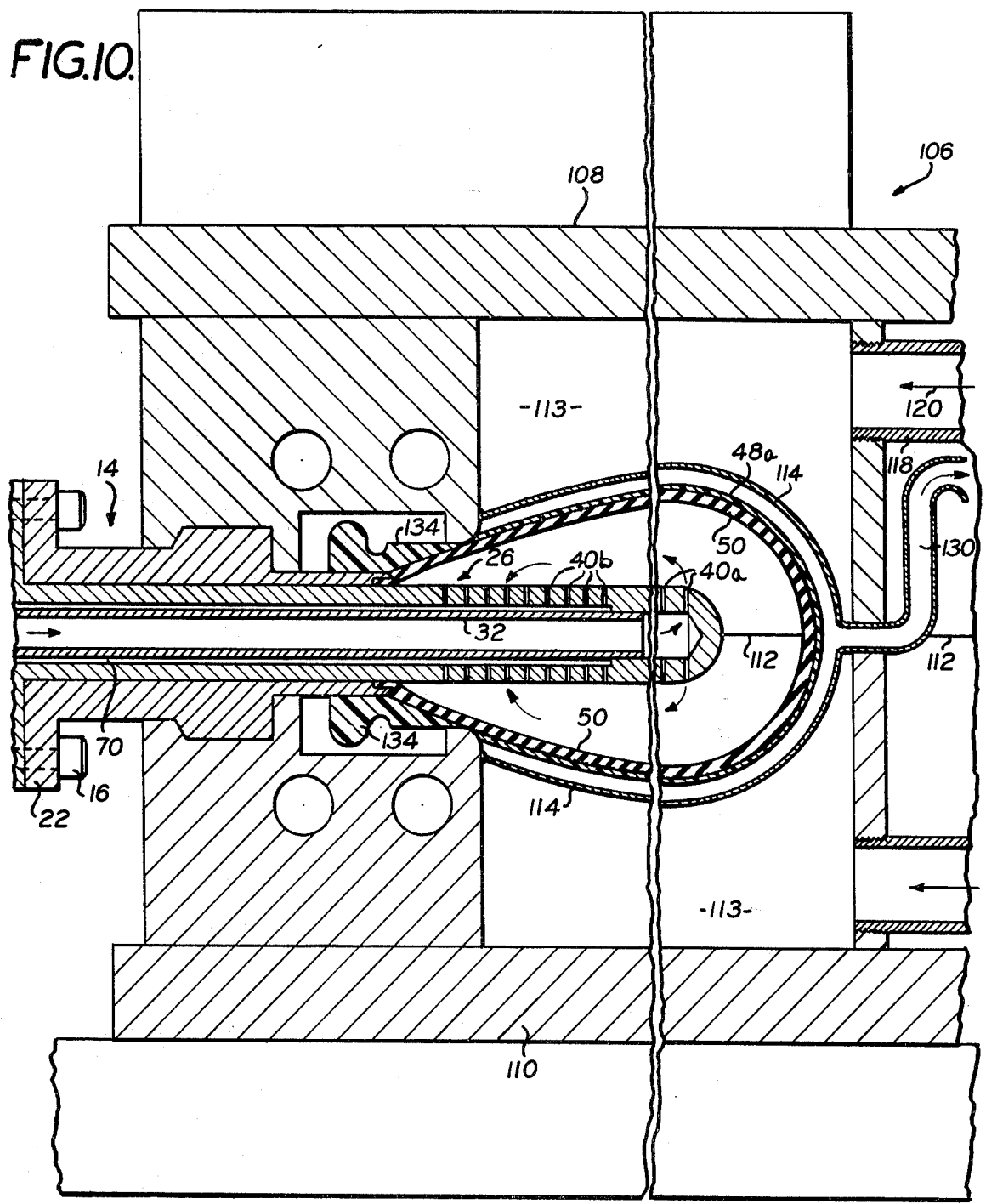
FIG. 10 is a diagrammatic, sectional view, partly broken away, showing a core rod assembly, similar to that in FIG. 1, placed in a unique blowing mold in which the parison is expanded against a fluid cushion instead of into contact with a solid surface.

FIG. 1 shows a core rod support 12, such as an indexing head. A core rod assembly 14 is connected to the support by fastening means such as screws 16.

The core rod assembly 14 includes a base flange or spacer block 18 to which is connected to a sleeve 20a. This sleeve 20a has a flange 22 which is attached to the spacer block 18 by the screws 16.

The sleeve 20a also has a shoulder 22a and an end face 24.

Within the sleeve 20a there is a core rod 26. In the illustrated construction the base flange or spacer block 18 is an integral part of the core rod 26 and there is an inner end portion 28 of the core rod which fits into a recess 30 in the core rod support 12. Thus the core rod is attached to the support 12 by the screws 16.

For the portion of the core rod nearest to the support 16 there is a pipe or tube 32 extending coaxially along the length of the core rod, and with the outside diameter of the tube 32 somewhat less in diameter than the hollow interior 34 of the core rod. Near the outer end (right hand in FIG. 1) of the tube 32 the interior diameter of the core rod is reduced at a location 36. The cube 32 fits tightly into the core rod at this reduced diameter 36; and beyond the end of the tube 32, much of which is broken away in FIG. 1, there is a chamber 38 enclosed by the core rod.

There are a multitude of openings 40a and 40b. The openings 40a communicate with the chamber 38 within the core rod. The openings 40b communicate with an annular chamber which comprises the space between the tube 32 and the larger interior diameter portion 34 of the core rod.

Fluid, either liquid or gas, flows through the tube 32 in the direction indicated by the arrows 42 and this fluid flows out through the openings 40a in directions indicated by the arrows 42 near the end of the core rod 26. This circulating fluid which flows out of the core rod 26 through the openings 40a flows back into the annular chamber between the tube 32 and the interior larger diameter portion 34 of the core rod as indicated by the arrows 44. This exhaust flow is indicated by the arrows 44 along the outside of the tube 32 in FIG. 1.

As long as the pressure of the fluid supply to the core rod is adjusted with respect to the back pressure of the fluid exhaust so that pressure builds up within the space surrounding the core rod, a parison 48 will be blown and expanded. The core rod structure shown in FIG. 1 can be used in several ways. Fluid can be circulated continuously through the openings 40a and 40b so as to cool the parison 48 from the inside, or to bring it to a particular temperature desired for orientation of the parison, or a given quantity of liquid can be injected into the parison from the openings 40a while liquid in the exhaust passage of the core rod is blocked.

When a given volume of liquid is thus introduced into the parison from the core rod, while exhaust of liquid from the passages 40b is blocked, then the parison will be blown to a predetermined volume depending upon the volume of the liquid. The shape of the blown article, under such circumstances, can be determined by a balloon 50 attached to the core rod assembly in a manner which will be explained. The thickness and elasticity of the walls of the balloon 50, which can be different at different locations if desired, determines the shape to which the balloon expands and thereby determines the shape of the article blown from the parison 48, even though the blowing is not performed in a blowing mold.

The balloon 50 is an elastic balloon which is permanently connected to the core rod assembly and this balloon hugs the outside surface of the core rod 26 when the balloon is collapsed.

The use of such a balloon is advantageous even when blowing the parison in the cavity of a blow mold because it permits the circulation of cooling fluid inside the balloon and parison at substantial velocities for rapid cooling and such circulation of cooling fluid could not be used if in direct contact with the molten parison 48. Another advantage of the balloon 50 is that it permits the parison to be expanded by the use of much higher pressures than are conventional and the use of such higher pressures makes possible the blowing of the parison at orientation temperatures where the plastic material of the parison is beginning to solidify and the parison cannot be expanded except by the use of much higher pressures than are used for conventional blow molding. Such pressures could not be used without the balloon because of the risk of bursting the wall of the parison at points which were somewhat weaker than other points.

The balloon 50 is attached to the core rod assembly by having a mouth portion 52 of the balloon 50 bear against the end face 24 (FIG. 8) of the sleeve 20. The end of the mouth portion of the balloon extends into an undercut recess 54 of the sleeve 20 and as an additional feature for increasing the strength of this connection there are screw threads 56 as part of the wall of the undercut recess 54. While the portion of the balloon bulges into the undercut recess 54 is jammed between the sleeve 20 and the core rod that the sleeve surrounds, as shown in FIG. 1, adhesive is also preferably used to obtain a tight connection between the balloon 50 and the sleeve 20.

In spite of the strong connection provided by the construction shown in FIG. 8, wear and tear on the balloon is further reduced by having the outside surface 60 of the sleeve 20, which is beyond the shoulder 22a, serve as a part of the parison supporting surface of the core rod assembly. After the parison is blown to its full size, and the balloon 50 is collapsed into position hugging the core rod, the outside diameter of the balloon is less than the diameter of the sleeve surface 60 so that the mouth portion of the blown article can be stripped axially from the core rod assembly without imposing any axial pull on the collapsed balloon 50.

In order to collapse the balloon 50, after a blowing operation, it is essential that provision be made for admitting air between the outside of the balloon and the inside of the blown article. Otherwise reduced pressure within the balloon will not collapse the balloon because vacuum will prevent the balloon 50 from pulling away from the blown parison 48.

FIGS. 1, 2 and 3 illustrate means for admitting air between the balloon and the blown parison, and air supply tube 62 communicates with a passage 64 in the core rod support 12. There is a circumferential groove 66 around the outside of the flange 18 within the socket 30. This circumferential groove cummunicates through a passage 68 which communicates with another passage 70 formed by a groove in the outside surface of the core rod 26. This groove passage 70 leads to another circumferential groove 72 in the outside surface of the core rod 26.

There are angularly spaced openings through the sleeve 20 leading from the annular groove 72 through a part of the outside surface of the sleeve 20 over which the parison 48 extends.

Small poppet valves 76 in the openings 74 prevent plastic material from being injected into the openings 74 when the core rod structure is extending into an injection mold.

When pressure is supplied from the tube 62 through the passages 64, 66, and connecting passages to the radial passages 72, at the end of a blowing operation, this pressure moves the poppet valves 76 outwardly far enough to permit air to enter between the blown parison and the balloon. channels 78 in the outside surface 60 of the sleeve 20 can be provided leading axially from the openings 72; however these channels are not essential because the air pressure expands the mouth portion of the parison, when the blow mold opens, and permits free flow of air axially to the outside surface of the balloon 50.

The inner end of the core rod 26 is in axial alignment with a tube 82 that forms a continuation of the center passage through the tube 32. This tube 82 has a splined outer surface 84 for providing continuation of the annular chamber through which fluid exhausts along the core rod. The portion of the tube 32 near the inner end of the core rod is preferably made with a splined surface from the location 86'; this surface being similar to that shown in FIG. 5 and for the purpose of maintaining the coaxial relation of the tube 32 in the core rod.

FIG. 6 shows a modified construction for introducing air between the air balloon and the blown parison. In FIG. 6 a balloon 50' is covered by a parison 48'; and the parison 48' is shown blown to its full size in a blowing mold 86. The end wall of the balloon 50' has an opening 88 at its center. There is a bead 90 formed on the edge of the opening 88 of the balloon and this bead is held in an undercut slot 92. The undercut slot is formed in an end portion of a core rod 94 which may be similar in construction to the core rod in FIG. 1 except for the open end with a tapered seat 96 against which a poppet valve 98 closes.

In the construction illustrated, there is a flange 100 on the end of the core rod 94 to prevent the portion of the balloon near the opening from flexing and to provide a surface against the parison 48' along which the air flows initally on its way to the interface between the parison 48' and the balloon 50'. The valve 98 is operated by a valve stem 102 leading back into the support for the core rod and to actuating mechanism that opens the valve in response to the control means for the cycle of the machine.

FIG. 7 shows a sleeve 20' which is similar to the sleeve 20 shown in FIG. 1. Other structure in FIG. 7, which corresponds to that in FIG. 1, is indicated by the same reference character with a prime appended. The sleeve 20' is shown without any core rod in it; but a balloon 50' is secured to an end face 24' shown in greater detail in FIG. 9. The connection of the balloon 50' to the sleeve 20' is a simpler construction than that shown in FIG. 8. The face 24' is formed with a Vee depression which increases the surface area of the end face 24'. The mouth of the balloon, which contacts with the face 24', is thicker than the rest of the balloon 50' and is shaped to fit into the Vee groove in the face 24'. This provides a large surface area for an adhesive connection of the balloon 50' to the end face 24'.

The construction shown in FIG. 9 is not as strong a connection as that shown in FIG. 8; but for many purposes it is more than adequate and it is easier to construct.

FIG. 10 shows diagrammatically the core rod assembly 14 of FIG. 1 used with a parison 48a from a different injection mold than that used for the parison 48 of FIG. 1. FIG. 10 also shows a blowing mold indicated generally by the reference character 106. An upper mold part 108 separates from a lower mold part 110 along a plane 112 in order to open the mold.

The mold 106 encloses a cavity 112 which contains a shroud 114 of circular cross section at right angles to the longitudinal axis of the core rod 26. The shroud 114 is made in two parts, one of which is attached to the upper mold section 108 and the other to the lower mold section 110. The parts of the shroud 114 separate along the plane 112 in the same manner as the upper and lower sections of the mold 106.

Air or other gas is introduced into the cavity 112 through a supply pipe 118 in the direction indicated by the arrow 120. This air enters the cavity 112 around the outside of the shroud 114 which is smaller than the cavity 112 in both its vertical and horizontal extent. There is clearance around the shroud 114 both behind and in front of the shroud as viewed in FIG. 10 so that the air circulates freely and the pressure is substantially the same in both the upper and lower parts of the cavity 112.

Figure 11:
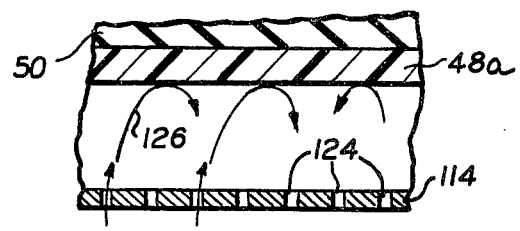
FIG. 11 is an enlarged detail view of a portion of the structure shown in FIG. 10.

FIG. 11 shows a portion of the shroud 114 on a larger scale. There are a multitude of small openings 124 through the shroud 114 over substantially the entire area of the shroud. These openings 124 are not shown in FIG. 10 because the scale of FIG. 10 is too small.

FIG. 11 shows the way in which air entering the inside of the shroud 114 impinges on the surface of the parison 48a. The air flow is indicated by arrows 126; and the jets of air flowing into the inside of the shroud 114 through the openings 124 are strong enough to build up an air cushion in the shroud 114. The parison 48a is expanded by the balloon 50 against this cushion of air.

The pressure of the cushion of air within the shroud 114 increases as the parison 48a is expanded until the pressure approaches the upstream pressure of the air at the upstream sides of the openings 124.

The temperature of the air introduced into the chamber 112 can be at the orientation temperature of the material of the parison 48a so that the parison is blown at its orientation temperature to produce a stronger container wall. Cold air can be introduced into the chamber 112 toward the end of the blowing period to cool the parison 48a quickly to a temperature below its melting point so as to facilitate collapse of the balloon 50 and removal of the core rod assembly, balloon and parison from the blowing mold.

Air is withdrawn from the inside of the shroud 114 through an exhaust pipe 130 at a controlled rate which depends upon the pressure buildup desired within the shroud 114.

The operation illustrated in FIGS. 10 and 11, in which the parison is blown against an air cushion instead of being blown into contact with a solid wall of a blow mold cavity is intended primarily for making containers which have thin walls that are pliant and flexible in the finished container. Such containers are made with a thick and rigid neck or mouth portion 134 as illustrated in FIG. 10. This mouth portion 134 is, however, made of the same material as the rest of the parison and is therefore of one-piece construction with the flexible walls of the container. Such a construction is obtained by having an injection mold with more space for parison material in the region of the neck than in the portion that will form the side wall of the container, or by designing the apparatus so as to expand the wall portion substantially more than with the usual blown plastic container.

The preferred embodiments of the invention has been illustrated and described, but changes and modifications can be made and some features can be used in different combinations without departing from the invention as defined in the claims.

I claim:

1. A core rod for blow molding comprising a rod having first passage means and first orifice means communicating with said first passage means and with a mold chamber exterior of said rod and into which said core rod extends, and having second passage means and second orifice means communicating with said second passage means and with said chamber, means to provide blowing fluid under pressure into said chamber through said first passage means and first orifice means and said blowing fluid is removed from said chamber through said second orifice means and second passage means and wherein said first passage means comprises a tube coaxially disposed within said rod and said first orifice means is disposed at the end of the rod extending into said chamber, and said second passage means comprises an annular space between the exterior surface of said tube and the interior surface of the rod, and the second orifice means being spacedly disposed from said first orifice means and being spaced from the end of the rod extending into the chamber, and further comprising means to provide a fluid tight connection between the portion of said tube disposed at said end of the rod and the interior surface of the rod.

2. The core rod of claim 1, wherein said first orifice means comprises a plurality of openings in said rod and said second orifice means comprises a plurality of openings in said rod.

* * * * *